United States Patent Office 3,553,178
Patented Jan. 5, 1971

3,553,178
CARBON DIOXIDE AS AN ETHYLENE POLYMER COAGULANT
Bert H. Clampitt and Rajindar K. Kochhar, Overland Park, and Robert K. Bartholomew, De Soto, Kans., and Harold L. Burrus, Grain Valley, Mo., assignors to Gulf Research & Development Company, Pittsburgh, Pa., a corporation of Delaware
No Drawing. Filed Sept. 7, 1967, Ser. No. 665,962
Int. Cl. C08f 47/00
U.S. Cl. 260—80.72   9 Claims

ABSTRACT OF THE DISCLOSURE

Water-insoluble, self-emulsifiable ethylene polymers containing pendent carboxylate salt groups are recovered from aqueous dispersions of such polymers by contacting such dispersions with carbon dioxide.

CROSS REFERENCES TO RELATED APPLICATIONS

Copending application Ser. No. 131,108, filed Aug. 14, 1961 by Jack Hurst and Harry D. Anspon describes the preparation of aqueous dispersions of water-insoluble, self-emulsifiable ethylene polymers containing pendent carboxylate salt groups which can be suitably employed in the process of this invention. As described therein, water-insoluble, but self-emulsifiable ethylene polymers containing pendent carboxylate salt groups are prepared by the hydrolysis in an aqueous medium of the acrylate groups of a thermoplastic ethylene-alkyl acrylate interpolymer employing elevated temperatures, a metallic base, and, optionally, a nitrogenous base to produce a stable aqueous dispersion of the ethylene polymer. Reference is made to application Ser. No. 131,108 for complete descriptions of methods of preparing aqueous polymeric dispersions applicable in the hereinafter described invention.

Copending application Ser. No. 585,283, now abandoned, filed Oct. 10, 1966, by B. H. Clampitt describes the preparation of aqueous dispersions of water-insoluble, self-emulsifiable ethylene polymers containing ammonium salt groups which can also be employed in the process of this invention. As described therein, dispersions of water-insoluble, self-emulsifiable ethylene polymers containing pendent metallic salt groups are contacted with an ion exchange medium comprising a strongly acidic cation exchange resin charged with ammonium ions. The ammonium ions are exchanged for the metallic cations of the aqueous dispersion. A stable aqueous dispersion substantially free of metallic cations and containing an ethylene polymer having pendent ammonium salt groups is recovered from the ion exchange zone. Reference is made to application Ser. No. 585,283 for a complete description of the method of preparing aqueous dispersions of ethylene polymers containing pendent ammonium salt groups which are applicable in practicing the process of the hereinafter described invention.

BACKGROUND OF THE INVENTION

This invention relates to an improved process for the recovery of ethylene polymer solids from stable aqueous dispersions of such solids. In another aspect, this invention relates to a coagulation process for the recovery of self-emulsifiable, water-insoluble ethylene polymer solids from stable aqueous dispersions of such ethylene polymers. In yet another aspect, this invention relates to a process wherein pendent carboxylate salt groups of aqueous dispersions of water-insoluble, self-emulsifiable ethylene polymers are substantially converted to the acid form and the resultant coagulated ethylene polymer solids recovered from such aqueous dispersions.

In the preparation of water-insoluble, self-emulsifiable ethylene polymers, a suitable process comprises hydrolyzing an ethylene-alkyl acrylate thermoplastic polymer in the presence of water, utilizing an alkali metal hydroxide, and, optionally, a nitrogenous base such as ammonia to produce a stable aqueous dispersion of the ethylene polymer. The hydrolysis reaction produces a polymer wherein at least a self-emulsifiable portion of the acrylate groups are in hydrophilic form. Heretofore, these self-emulsifiable polymer solids have been recovered from the dispersions by coagulation with water-miscible nonsolvents such as acetone, by coagulation employing mineral or organic acids, or by employing inorganic salts of the polyvalent cations to coagulate the dispersed solids.

The use of acetone in a commercial process in necessarily large quantities, with normally attendant acetone process losses in the separation of the polymer solids therefrom, is not economically feasible. Coagulation processes employing mineral or organic acids require the washing of the precipitated polymer with voluminous amounts of deionized water, substantially increasing process costs. Additionally, residual acid present in the ethylene polymer resin may result in polymer degradation and process equipment corrosive action during subsequent processing steps.

The polymer product recovered from a self-emulsifiable ethylene polymer aqueous dispersion using a salt containing polyvalent ions or acetone as the coagulative or precipitative agent has radically different properties such as, for example, low melt flow and poor processibility. Moreover, the coagulated solids obtained with the use of polyvalent ions cannot readily be redispersed in water.

Accordingly, an object of our invention is to provide an improved process for the recovery of water-insoluble, self-emulsifiable ethylene polymers from stable aqueous dispersions of such polymers.

Another object of our invention is to provide an improved process for the recovery of water-insoluble, self-emulsifiable ethylene polymers containing pendent carboxylate salt groups from stable aqueous dispersions of such polymers.

Other objects, advantages and features of our invention will be readily apparent to those skilled in the art from the following description and appendent claims.

SUMMARY OF THE INVENTION

Water-insoluble, self-emulsifiable ethylene polymers containing pendent carboxylate salt groups are recovered from aqueous dispersions of such polymers by contacting such dispersions with carbon dioxide and recovering therefrom coagulated polymer solids. Advantageously, the contact temperature is less than 30° C. for aqueous dispersions containing less than about 10 weight percent solids and from 30° to 80° C. for those dispersions containing greater than about 10 weight percent solids.

Preferably, the coagulated solids are heated to an elevated temperature, normally to a temperature above 50° C., prior to separation from the aqueous medium when the pendent carboxylate salts are metallic salts, thereby reducing the amount of water retained by the separated polymer solids. Filtration of solids from the aqueous medium is aided by heating the coagulated solids to the elevated temperature prior to separation.

The inventive coagulation or precipitation processes employing carbon dioxide, a mild precipitating agent, has significant advantages over conventional percipitation processes in that high volume washing of the separated solids is eliminated, process losses of relatively expensive precipitation agents are eliminated, and the handling of corrosive liquids with attendent equipment failures is not required.

DESCRIPTION OF THE INVENTION

The invention is directed to the recovery of water-insoluble, self-emulsifiable ethylene polymer solids from aqueous dispersions of such solids wherein the self-emulsifiable ethylene polymer contains pendent carboxylate salt groups. Although not to be limited thereto, the invention has been found to be particularly applicable to the separation and recovery of ethylene-alkyl acrylate polymer solids wherein a self-emulsifiable portion of the acrylate groups are in the alkali metal or ammonium salt form.

As heretofore noted aqueous dispersions of such ethylene polymers can be prepared by the hydrolysis of a thermoplastic ethylene-alkyl acrylate polymer in an aqueous medium utilizing an alkali metal hydroxide and, optionally, a nitrogenous base such as ammonia to hydrolyze a portion of all of the acrylate groups to the carboxylate salt and, optionally, acid and/or amide form.

The ethylene-alkyl acrylate polymers which can be hydrolyzed to provide aqueous dispersions of water-insoluble, self-emulsifiable ethylene polymers can be those polymers described by George E. Ham, Harry D. Anspon and William H. Byler in copending application Ser. No. 335,732, filed Jan. 6, 1964. The ethylene-alkyl acrylate polymers so prepared can be hydrolyzed by the process described in copending application Ser. No. 131,108. As described in the latter-named aplication an ethylene-alkyl acrylate copolymer is hydrolyzed to form a water-insoluble, self-emulsifiable ethylene polymer wherein at least a portion of the acrylate groups are in carboxylate salt form. The hydrolysis is effected by contacting at an elevated temperature the thermoplastic polymer containing pendent carboxylate salt groups which is dispersed throughout the aqueous medium.

"Water-insoluble" as used herein refers to the inability of the fused solid ethylene polymer to become dissolved in water as measured, for example, by preparing a one-half mil cast film of the product polymer, placing a 10 x 10 centimeter sample in one liter of water maintained at a temperature of 30° C. for a period of 24 hours, removing the film from the water, drying the film to a constant weight at 120° C., and determining that the weight loss in the film when compared to the weight of the original film sample shall be less than 10 weight percent. "Self-emulsifiable" as used herein refers to that property of the polymer whereby one gram of the polymer in particulate form can be readily dispersed in 100 ml. of water in a stirred metal autoclave maintained at a temerature in the range of 180 to 300° C. to provide, in the absence of an emulsifying agent, a shelf-stable dispersion wherein the average particle size is two microns or less.

The inventive process is applicable to the recovery of self-emulsifiable ethylene polymer solids from stable dispersions of such solids wherein the dispersed ethylene polymer contains pendent carboxylate salt groups and wherein the concentration of carboxylate salt groups in the ethylene polymer is sufficient for self-emulsification. In addition to the pendent carboxylate salt groups the ethylene polymer can also contain other pendent or substituent groups such as amide, acid or ester groups.

The invention is also applicable to the recovery of water-insoluble, self-emulsifiable ethylene polymer solids from aqueous dispersions of such solids obtained by the process described in copending application Ser. No. 585,283. As described therein, aqueous dispersions of water-insoluble, self-emulsifiable ethylene polymers containing pendent metallic salt groups are contacted with an ion exchange medium comprising a strongly acidic cation exchange resin charged with ammonium ions. The ammonium ions are exchanged for the metallic cations of the aqueous dispersion and a stable aqueous dispersion of an ethylene polymer having pendent ammonium salt groups is recovered from the ion exchange zone.

Those ethylene polymers which are considered to be particularly applicable in the process of our invention are those ethylene-alkyl acrylate polymers wherein the alkyl acrylate concentration is in the range of about 0.01 to about 0.5 (Preferably 0.025 to about 0.25) mol of acrylate groups per mol of contained ethylene groups. The water-insoluble, but self-emulsifiable ethylene-alkyl acrylate polymers are selected from the groups consisting of:

(1) Polymers containing 67–99 (preferably 87–95.2) mol percent of units (a) and, correspondingly, 33–1 (preferably 13.0–4.8 mol percent of units (b), (2) Polymers containing 67–99 (preferably 87–95.2) mol percent of units (a) and, correspondingly, 33–1 (preferably 13.0–4.8) mol percent of a mixture of units (b) and (c), (3) Polymers containing 67–99 (preferably 87–95.2) mol percent of units (a), and, correspondingly, 33–1 (preferably 13.0–4.8) mol percent of a mixture of units (b), (c) and (d), (4) Polymers containing 67–99 (preferably 87–95.2) mol percent of units (a) and, correspondingly, 33–1 (preferably 13.0–4.8) mol percent of a mixture of units (b), (c), (d) and (e), (5 Polymers containing 67–99 (preferably 87–95.2) mol percent of units (a) and, correspondingly, 33–1 (preferably 13.0–4.8) mol percent of a mixture of units (b) and (d), (6) Polymers containing 67–99 (preferably 87–95.2) mol percent of units (a) and, correspondingly, 33–1 (preferably 13.0–4.8) mol percent of a mixture of units (b) and (e), (7) Polymers containing 67–99 (preferably 87–95.2) mol percent of units (a) and, correspondingly, 33–1 (preferably 13.0–4.8) mol percent of a mixture of units (b), (c) and (e), (8 Polymers containing 67–99 (preferably 87–95.2) mol percent of units (a) and, correspondingly, 33–1 (preferably 13.0–4.8) mol percent of a mixture of units (b), (d) and (e), and (9) Mixtures of (1), (2), (3), (4), (5), (6), (7), and (8), said units (a) having the structure $$-CH_2-CH_2-$$

said units (b) having the structure

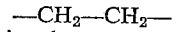

said units (c) having the structure

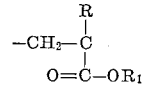

said units (d) having the structure

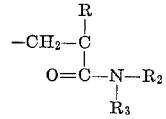

said units (e) having the structure

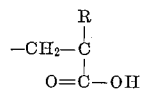

where R is selected from the group consisting of hydrogen and methyl, $R_1$ is selected from the group consisting of alkali metals, hydrogen, ammonium ion, silver, magnesium, zinc, cadimum, iron, cobalt, copper, calcium, aluminum, barium, titanium, tin, lead, chromium, quaterernary ammonium ion, and amine complexes with the above metals, $R_2$ and $R_3$ are independently selected from the group consisting of hydrogen, methyl, ethyl, propyl, butyl, hydroxy-ethyl, morpholine and heterocyclic groups containing up to 22 carbon atoms, and $R_4$ is a hydrocarbon group.

Coagulation or precipitation of the ethylene polymer solids contained in the aqueous dispersion is effected by containing the aqueous dispersion with carbon dioxide. The precipitating agent can be a gas or a solid. Although not to be limited thereto, it has been observed that rapid coagulation and precipitation of the polymer solids is effected in those aqueous dispersions wherein the concentration of solids is less than about 10 weight percent, by employing a coagulation temperature under about 30° C. When the aqueous dispersion contains a higher concentration of polymer solids, precipitation at higher temperatures up to about 80° C. is preferred.

In those cases where the pendent carboxylate salts of the dispersed ethylene polymer are metallic salts, the coagulated or precipitated solids are preferably heated to an elevated temperature prior to the separation of the solids from the aqueous medium. It has been observed that this elevated temperature treatment reduces the amount of water retained by the separated solids, and in those instances where separation is effected by filtration, the elevated temperature treatment substantially improved the efficiency of separation.

The coagulated or precipitated polymer solids can readily be separated from the aqueous medium by conventional separation processes, such as filtration, centrifugation and decantation. The coagulated or precipitated solids obtained by the process of this invention are readily redispersed in an aqueous medium by the utilization of an elevated temperature, an alkali metal hydroxide and/or nitrogenous base such as ammonium hydroxide.

Preferably, precipitation of the ethylene polymers is effected by passing carbon dioxide as a gas through the aqueous medium for a time sufficient to effect precipitation. Normally precipitation occurs with a contact time of less than about 10 minutes. The precipitation can be effected by employing the carbon dioxide gas at atmospheric or superatmospheric pressures. When carbon dioxide either as a gas or solid is employed, coagulation of the polymer solids is normally completed when the pH of the aqueous medium has been lowered to about 8.

In the coagulation of the ethylene polymer solids at least a portion of the pendent carboxylate salt groups are converted to carboxyl groups. In those instances when the pendent carboxylate salt groups are ammonium salt groups, complete conversion to carboxyl groups is effected. Amide, ester and acid pendent groups of the dispersed ethylene polymer, when present, do not adversely affect the coagulation process.

The folowing examples are presented as illustrative of the objects, advantageous and features of the invention. It is not intended, however, that the invention should be limited to the specific employments presented therein.

EXAMPLE I

In each of these examples the effectiveness of the invention in the precipitation of ethylene polymer solids from aqueous dispersions of such solids is demonstrated. The ethylene polymer aqueous dispersion is prepared by the potassium hydroxide hydrolysis of an ethylene-methyl acrylate copolymer to produce a self-emulsifiable ethylene polymer containing pendent potassium salt groups. The prepared aqueous dispersion contains 13.4 weight percent solids, has a pH of 12.6 and contains no pendent ester groups. Analysis of the ethylene polymer indicates that the concentration of potassium present in the pendent carboxylic salt group is 8.29 weight percent.

In this example the aqueous polymer dispersion is diluted with water to prepare a dispersion containing 6.5 weight percent polymer solids. Carbon dioxide as Dry Ice is introduced into the aqueous dispersion. The polymer solids are coagulated and separated from the aqueous dispersion by filtration. 91.4 weight percent of the polymer solids are recovered by the coagulation process.

Analysis of the recovered polymer solids shows that the concentration of potassium contained therein is 1.88 weight percent, indicating that a substantial portion of the potassium salt groups are converted to the acid form. The melt index as determined by ASTM D 1238–65T, FR–D is 0.071. The tensile strength, yield and break, are 1858 and 5414 p.s.i., respectively, and the percent elongation is 342. The tensile and percent elongation tests are determined by ASTM D 638–64T.

EXAMPLE II

The aqueous ethylene polymer dispersion of Example I is maintained at a temperature of 70° C. and carbon dioxide gas is continuously passed throughout the aqueous dispersion. 87.9 weight percent of the dispersed polymer solids are recovered in coagulated form from the aqueous dispersion by filtration.

Analysis of the recovered polymer solids shows that the concentration of potassium is 2.07 weight percent. This indicates that the potassium salt groups are substantially converted to the acid form. The melt index of the recovered polymer solids is 0.071 as determined by the test method of Example I. The tensile strengths, yield and break, are 1904 and 5147 p.s.i., respectively, as determined by the test methods of Example I. The percent elongation is 307 as determined by the test method of Example I.

Although the invention has been described with reference to specific materials, embodiments and details, various modifications and changes, within the scope of this invention, will be apparent to one skilled in the art and are contemplated to be embraced in the invention.

EXAMPLE III

In this example the effectiveness of the invention in the precipitation of ethylene polymer solids from aqueous dispersions of such solids wherein the ethylene polymer contains pendent carboxylic salt, amide, and ester groups is demonstrated. The ethylene polymer of the aqueous dispersion is an ethylene-methyl acrylate copolymer containing 20 weight percent methyl acrylate which is hydrolyzed to produce an ethylene polymer wherein 50 percent of the pendent acrylate groups are in sodium salt form, 35 percent of the pendent acrylate groups are in amide form, and 15 percent of the acrylate groups are in acid form. This prepared aqueous dispersion contains 7.0 weight percent solids.

Carbon dioxide gas is continuously passed through the aqueous dispersion at room temperature and at a pressure of 40 p.s.i. for a period of 10 minutes. The precipitated and coagulated solids are heated to a temperature of 70° C. and separated from the aqueous medium by filtration.

Analysis of the recovered solids shows that the concentration of sodium has been reduced from 2.6 weight percent to 0.77 weight percent of the polymer. 97.0 weight percent of the polymer solids present in the aqueous dispersion is recovered. The melt index of the recovered solids is 0.44. The tensile strengths, yield and break, are 1706 and 5112 p.s.i., respectively, and the percent elongation is 329. The melt index, tensile and percent elongation tests are determined by the test methods of Example I.

EXAMPLE IV

In this example the effectiveness of the invention in the precipitation of ethylene polymer solids from aqueous dispersions of such solids wherein the ethylene polymer contains pendent ammonium salt groups is demonstrated. The ethylene polymer aqueous dispersion is prepared by the potassium hydroxide hydrolysis of an ethylene-methyl acrylate copolymer containing 20 weight percent methyl to produce a self-emulsifiable ethylene polymer containing pendent potassium salt groups. This prepared aqueous dispersion is passed downwardly through an ion exchange zone containing a strongly cationic exchange resin (Dowex 50 manufactured and distributed by Dow Chemical Company) charged with ammonium ions. An aqueous dispersion of the ethylene polymer containing pendent ammonium salt groups is withdrawn from the ion exchange zone.

Carbon dioxide is continuously passed through the aqueous dispersion at room temperature and atmospheric pressure for a period of 10 minutes. The ethylene polymer solids are precipitated from the aqueous medium and the coagulated solids separated from the aqueous medium by filtration. 97.5 weight percent of the polymer solids are recovered from the aqueous dispersion and analysis of the polymer solids indicates that all of the ammonium salt groups have been converted to the acid form.

Although the invention has been described with reference to specific materials, embodiments and details, various modifications and changes, within the scope of this invention, will be apparent to one skilled in the art and are contemplated to be embraced in the invention.

We claim:

1. A process which consists essentially of contacting a basic aqueous dispersion of a water-insoluble, self-emulsifiable ethylene polymer containing pendent carboxylate salt groups with carbon dioxide, and recovering therefrom precipitated ethylene polymer solids.

2. The process of claim 1 wherein said carboxylate salt is a metallic salt and to include heating the carbon dioxide contacted aqueous dispersion to an elevated temperature prior to separation of the precipitated polymer solids from the aqueous dispersion.

3. A process which consists essentially of contacting a basic aqueous dispersion of a water-insoluble, self-emulsifiable ethylene polymer containing pendent carboxylate salt groups with carbon dioxide, said aqueous dispersion containing less than about 10 weight percent polymer solids, maintaining the temperature of said aqueous dispersion at less than about 30° C., and recovering therefrom precipitated ethylene polymer solids.

4. A process which consists essentially of contacting a basic aqueous dispersion of a water-insoluble, self-emulsifiable ethylene polymer containing pendent carboxylate salt groups with carbon dioxide, the polymer solids concentration in said aqueous dispersion comprising more than about 10 weight percent, maintaining the temperature of said aqueous dispersion between about 30° C. and 80° C., and recovering therefrom precipitated ethylene polymer solids.

5. The process of claim 1 wherein said carboxylate salt is selected from the group consisting of the alkali metal and ammonium salts.

6. The process of claim 5 wherein said ethylene polymer contains at least one additional substituent selected from the group consisting of amide, ester and acid groups.

7. A process which consists essentially of contacting a basic aqueous dispersion of a water-insoluble, self-emulsifiable ethylene polymer with carbon dioxide, said ethylene polymer selected from the group consisting of:

(1) polymers containing 67–99 mol percent of units (a) and, correspondingly, 33–1 mol percent of units (b), (2) polymers containing 67–99 mol percent of units (a) and, correspondingly, 33–1 mol percent of a mixture of units (b) and (c), (3) polymers containing 67–99 mol percent of units (a) and, correspondingly, 33–1 mol percent of a mixture of units (b), (c) and (d), (4) polymers containing 67–99 mol percent of units (a) and, correspondingly, 33–1 mol percent of a mixture of units (b), (c), (d) and (e), (5) polymers containing 67–99 mol percent of units (a) and, correspondingly, 33–1 mol percent of a mixture of units (b) and (d), (6) polymers containing 67–99 mol percent of units (a) and, correspondingly, 33–1 mol percent of a mixture of units (b) and (e), (7) polymers containing 67–99 mol percent of units (a) and, correspondingly, 33–1 mol percent of a mixture of units (b), (c) and (e), (8) polymers containing 67–99 mol percent of units (a) and, correspondingly, 33–1 mol percent of a mixture of units (b), (d) and (e), and (9) mixtures of (1), (2), (3), (5), (6), (7) and (8), said units (a) having the structure

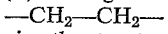

said units (b) having the structure

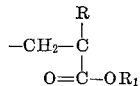

said units (c) having the structure

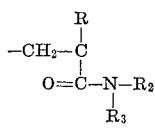

said units (d) having the structure

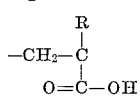

said units (e) having the structure

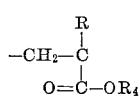

where R is selected from the group consisting of hydrogen and methyl, $R_1$ is selected from the group consisting of alkali metals, hydrogen, ammonium ion, silver, magnesium, zinc, cadmium, iron, cobalt, copper, calcium, aluminum, barium, titanium, tin, lead, chromium, quaternary ammonium ion, and amine complexes with the above metals, $R_2$ and $R_3$ are independently selected from the group consisting of hydrogen, methyl, ethyl, propyl, butyl, hydroxyethyl, morpholine and heterocyclic groups containing up to 22 carbon atoms, and $R_4$ is a hydrocarbon group, and recovering therefrom precipitated ethylene polymer solids.

8. The process of claim 7 wherein the concentration of polymer solids in said aqueous dispersion is less than about 10 weight percent and to include the step of maintaining the coagulation temperature at less than about 30° C.

9. The process of claim 7 wherein the concentration of polymer solids in said aqueous dispersion is more than about 10 weight percent and to include the step of maintaining a coagulation temperature in the range of 30–80° C.

References Cited

UNITED STATES PATENTS 3,350,372   10/1962   Anspon et al. _____ 260—86.7

OTHER REFERENCES

Schildknecht, Polymer Processes (1956) p. 153.

JOSEPH L. SCHOFER, Primary Examiner

S. M. LEVIN, Assistant Examiner

U.S. Cl. X.R.

260—80.73, 80.8, 88.1, 96

PO-1050
(5/69)

UNITED STATES PATENT OFFICE
CERTIFICATE OF CORRECTION

Patent No. 3,553,178        Dated January 5, 1971

Inventor(s) Bert H. Clampitt, Rajindar K. Kochhar, Robert K. Bartholomew, and Harold L. Burrus.

It is certified that error appears in the above-identified patent and that said Letters Patent are hereby corrected as shown below:

Column 2, line 71, the word "eliniated", should read --eliminated-- to be correct. Column 3, line 30, the word "aplication", should read --application-- to be correct. Column 4, line 26, the figure "(5" should read --(5)-- to be correct. Column 4, line 38, the figure "(8" should read --(8)-- to be correct. Column 5, line 53, the word "advantageous", should read --advantage-- to be correct. Column 5, line 69, the word "carboxylic", should read --carboxylate-- to be correct. Column 6, line 41, the word "carboxylic", should read --carboxylate-- to be correct. Column 8, line 12, "(9) mixtures of (1), (2), (3), (5), (6) (7) and", should read --(9), mixtures of (1), (2), (3), (4) (5), (6), (7) and-- to be correct.

Signed and sealed this 11th day of May 1971.

(SEAL)
Attest:

EDWARD M. FLETCHER, JR.
Attesting Officer

WILLIAM E. SCHUYLER, JR'
Commissioner of Patents